US012088242B2

United States Patent
Truthseeker et al.

(10) Patent No.: US 12,088,242 B2
(45) Date of Patent: Sep. 10, 2024

(54) CABLE MANAGEMENT SYSTEM

(71) Applicant: TECSI Solar, Inc., El Sobrante, CA (US)

(72) Inventors: Samuel Marcus-Flack Truthseeker, El Sobrante, CA (US); Daniel William Carey, Plano, TX (US); Charles Wade Albritton, Manchester, IA (US); Miles C. Russell, Lincoln, MA (US)

(73) Assignee: TECSI Solar, Inc., Austin, TX (US)

( * ) Notice: Subject to any disclaimer, the term of this patent is extended or adjusted under 35 U.S.C. 154(b) by 0 days.

(21) Appl. No.: 18/373,049

(22) Filed: Sep. 26, 2023

(65) Prior Publication Data

US 2024/0014775 A1    Jan. 11, 2024

Related U.S. Application Data

(63) Continuation of application No. 17/653,989, filed on Mar. 8, 2022, now Pat. No. 11,817,818, which is a continuation-in-part of application No. 15/746,968, filed as application No. PCT/US2016/043283 on Jul. 21, 2016.

(60) Provisional application No. 62/196,405, filed on Jul. 24, 2015.

(51) Int. Cl.
  *H02S 30/10* (2014.01)
  *H02G 3/04* (2006.01)

(52) U.S. Cl.
  CPC .......... *H02S 30/10* (2014.12); *H02G 3/0456* (2013.01)

(58) Field of Classification Search
  CPC ............................ H02G 3/0456; H02S 30/10
  See application file for complete search history.

(56) References Cited

U.S. PATENT DOCUMENTS

| 4,406,101 | A | * | 9/1983 | Heidmann | ................ E04B 2/82 |
| | | | | | 174/505 |
| 7,686,625 | B1 | | 3/2010 | Dyer et al. | |
| 8,382,513 | B2 | | 2/2013 | Kobayashi | |

(Continued)

FOREIGN PATENT DOCUMENTS

| CN | 102473763 A | 5/2012 |
| CN | 104380008 A | 2/2015 |

(Continued)

OTHER PUBLICATIONS

International Search Report and Written Opinion for PCT/US16/43283 issued on Oct. 26, 2016, 10 pages.

*Primary Examiner* — Uyen M Tran
(74) *Attorney, Agent, or Firm* — Armstrong Teasdale LLP

(57) ABSTRACT

A cable management system for managing cables associated with an array of solar modules includes a body having an interior surface extending vertically, a lower flange extending directly from the interior surface of the body, and a cable management flange extending directly from the interior surface of the body above the lower flange. The cable management flange and the lower flange define a cable cavity therebetween for retaining at least one cable. Distal ends of the lower flange and the cable management flange define an opening for inserting the at least one cable into the cable cavity. The cable management flange is arranged to engage the at least one cable and secure the at least one cable in the cable cavity. The cable management flange is flexible to accept and retain the at least one cable.

10 Claims, 18 Drawing Sheets

(56) References Cited

U.S. PATENT DOCUMENTS

| | | |
|---|---|---|
| 8,806,814 B2 | 8/2014 | Tseng et al. |
| 9,647,433 B2 | 5/2017 | Meine et al. |
| 2008/0302407 A1 | 12/2008 | Kobayashi |
| 2012/0261526 A1 | 10/2012 | Rentfrow |
| 2013/0068275 A1 | 3/2013 | Swahn et al. |
| 2014/0182662 A1* | 7/2014 | West .............. H02S 30/10 248/617 |
| 2015/0034362 A1* | 2/2015 | Kovalov ............ H01R 4/646 174/126.1 |
| 2015/0075587 A1 | 3/2015 | Veloso et al. |
| 2015/0144181 A1 | 5/2015 | Gilchrist et al. |
| 2015/0214889 A1 | 7/2015 | Nam et al. |
| 2016/0268959 A1* | 9/2016 | Meine ................ F24S 25/61 |

FOREIGN PATENT DOCUMENTS

| | | |
|---|---|---|
| CN | 104779901 A | 7/2015 |
| EP | 0977274 A2 | 2/2000 |
| JP | 2011035255 A | 2/2011 |

* cited by examiner

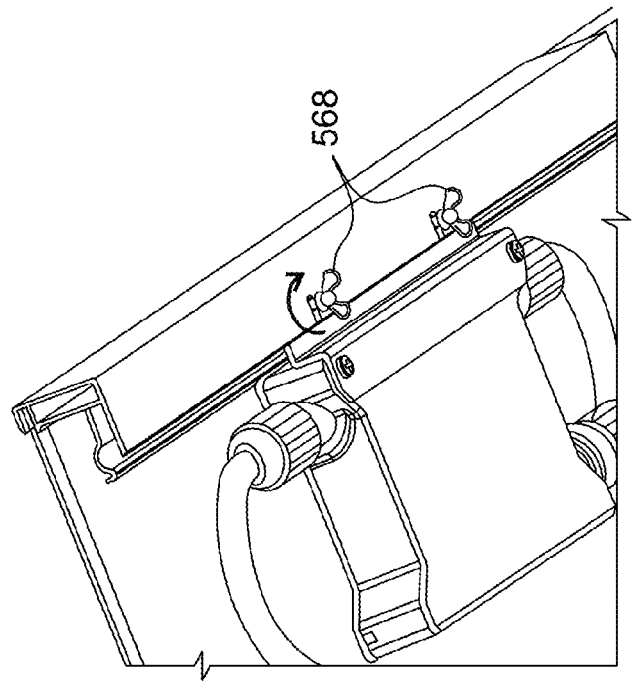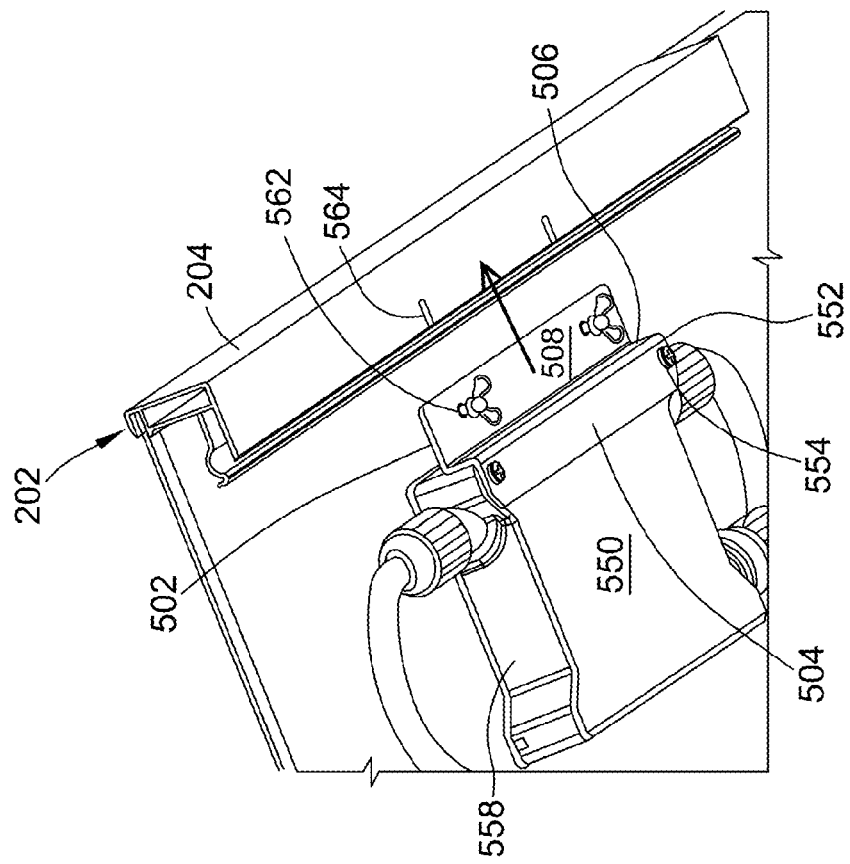
FIG. 6

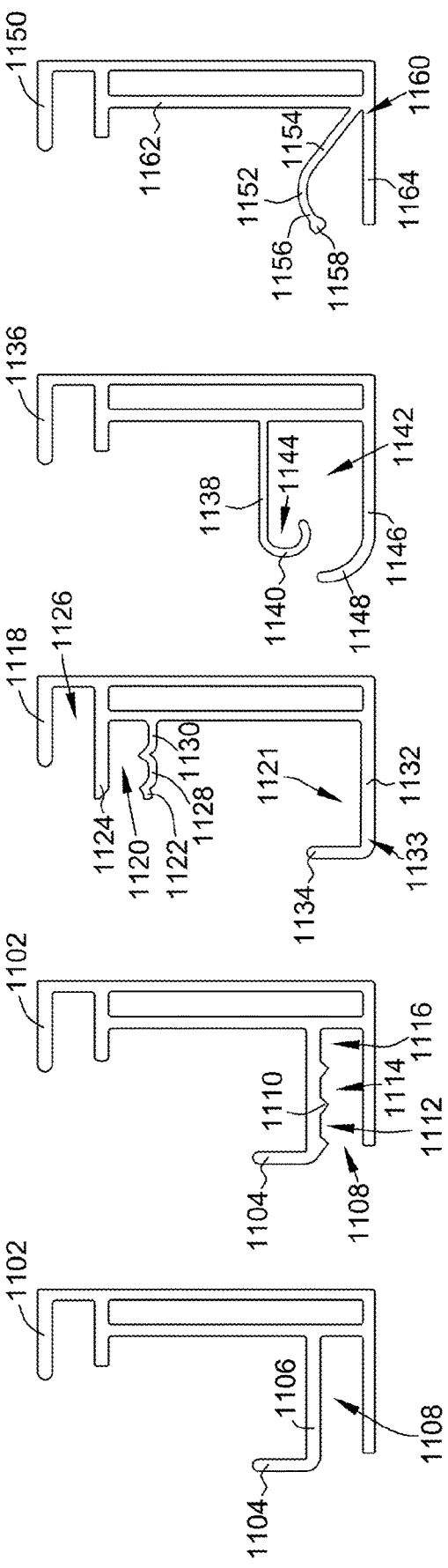

CABLE MANAGEMENT SYSTEM

CROSS-REFERENCE TO RELATED APPLICATIONS

This application is a continuation application of U.S. application Ser. No. 17/653,989, filed on Mar. 8, 2022, which is a continuation-in-part application of U.S. application Ser. No. 15/746,968, filed on Jan. 23, 2018, which is a National Stage application of International Application No. PCT/US2016/043283, filed on Jul. 21, 2016, which claims the benefit of priority to U.S. Provisional Patent Application No. 62/196,405, filed on Jul. 24, 2015, the entire contents and disclosures of which are incorporated by reference in their entirety.

FIELD

The field relates generally to cable management systems, and in particular to a cable management systems for managing cables associated with an array of solar modules.

BACKGROUND

An example of a solar module, for converting solar energy into useful forms of energy such as electricity, is a solar photovoltaic (PV) module. A PV module may include a series of PV cells in an assembly. Due to the fragility of the cells and the harsh environmental conditions they are often exposed to, the cells are often encapsulated in a rigid laminate. While PV laminates can be directly attached to a mounting structure, it is more common for them to be framed before mounting. PV module frames typically include aluminum extrusions having an upper cavity that receives the laminate when assembled. Frames for PV modules often include a mounting flange with pre-drilled holes for affixing the modules to mounting structures.

PV modules may also include various wiring, such as cables for connecting the PV module other PV modules, or, in an AC PV module, AC cables for connecting to other AC PV modules. These cables and wires may need to be managed and retained within a footprint of the panel, according to various building codes and installation best practices.

Known methods for cable management include using zip ties and/or metal clips to secure cable to the module frame. Zip ties may wear out and subsequently fail over time, and more durable metal clips may be relatively expensive. Moreover, if an installer does not have sufficient zip ties and/or metal clips, the installer may need to leave the installation site to retrieve more cable management implements. An improved system for managing cables in the frame is needed.

In addition, at least some known solar modules are relatively heavy (typically 30-40 pounds), and this weight must be lifted and maneuvered by handlers or installers during manufacturing and installation. Modules are generally carried by the module frame, and standard frames have sharp 90° edges, as well as a long, thin mounting flange (for mounting the frame to a structure) that requires the handlers to wear gloves and/or to carry the module overhead. Thus, gripping, holding, and carrying these frames may be difficult and uncomfortable. Moreover, such an uncomfortable grip can accelerate hand fatigue, which may increase the likelihood of a workplace accident (e.g., dropping a module). Accordingly, there is a need for ergonomic, but cost-effective features to aid in installation of solar PV modules.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a cable management system for managing cables associated with an array of solar modules includes a body having an interior surface extending vertically, a lower flange extending directly from the interior surface of the body, and a cable management flange extending directly from the interior surface of the body above the lower flange. The lower flange includes a distal end and defines an open recess above the lower flange. The cable management flange includes a distal end and divides the open recess into regions. The cable management flange and the lower flange define a cable cavity therebetween for retaining at least one cable. The distal ends of the lower flange and the cable management flange define an opening for inserting the at least one cable into the cable cavity. The cable management flange is arranged to engage the at least one cable and secure the at least one cable in the cable cavity. The cable management flange is flexible to accept and retain the at least one cable.

In another aspect, a solar array includes at least one cable and a cable management system. The cable management system including a body having an interior surface extending vertically, a lower flange extending directly from the interior surface of the body, and a cable management flange extending directly from the interior surface of the body above the lower flange. The lower flange includes a distal end. The cable management flange includes a distal end. The cable management flange and the lower flange define a cable cavity therebetween for retaining the at least one cable. The distal ends of the lower flange and the cable management flange define an opening for inserting the at least one cable into the cable cavity. The cable management flange is arranged to engage the at least one cable and secure the at least one cable in the cable cavity. The cable management flange is flexible to accept and retain the at least one cable.

In yet another aspect, a solar array includes a solar module, a mounting structure for the solar module, and a cable management system that secures at least one cable for the solar module or the mounting structure. The cable management system includes a body having an interior surface extending vertically, a lower flange extending directly from the interior surface of the body, and a cable management flange extending directly from the interior surface of the body above the lower flange. The lower flange includes a distal end. The cable management flange includes a distal end. The cable management flange and the lower flange define a cable cavity therebetween for retaining the at least one cable. The distal ends of the lower flange and the cable management flange define an opening for inserting the at least one cable into the cable cavity. The cable management flange is arranged to engage the at least one cable and secure the at least one cable in the cable cavity. The cable management flange is flexible to accept and retain the at least one cable.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 6 is a first perspective view showing an installation of a microinverter onto the frame shown in FIG. 2A using an adapter.

FIGS. 11A-11I show various additional embodiments of a solar module frame featuring cable management functionality.

DETAILED DESCRIPTION

Figure 1:
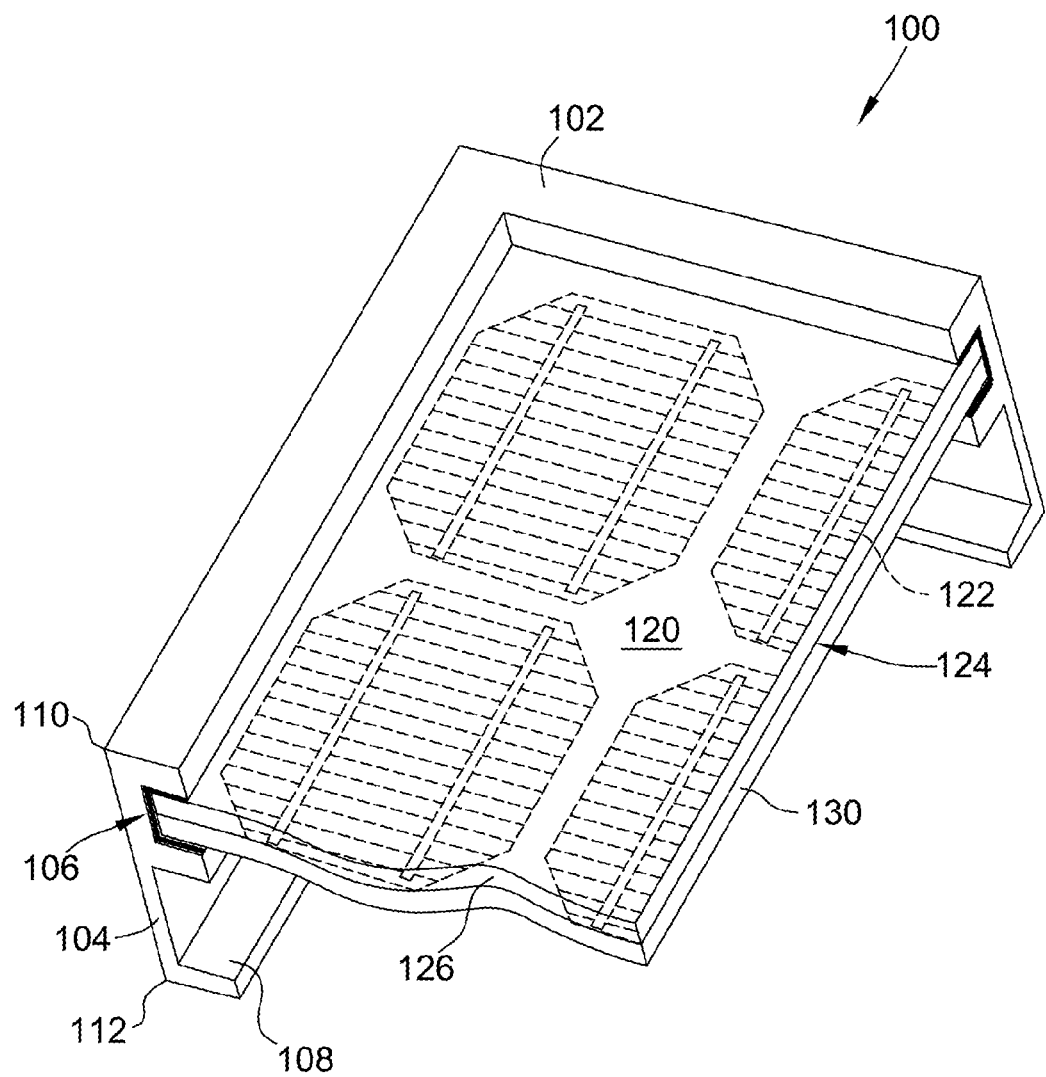
FIG. 1 is a perspective of an example prior art solar module.

FIG. 1 depicts an example known solar module 100. The module includes a frame 102 and a photovoltaic (PV) laminate 120. The laminate 120 includes plurality of PV cells 122 encapsulated in an active layer 124 between a glass cover 126 and a back cover 130. The laminate 120 may further include wiring (not shown) connecting the PV cells 122 in a series and parallel configuration.

The frame 102 includes a frame body 104, an upper cavity 106 configured to receive and retain the laminate 120, and a mounting flange 108. The mounting flange 108 extends from a bottom of the frame body 104. The mounting flange 108 may include a plurality of holes (not shown) for receiving fasteners to secure the frame 102 to a mounting surface (not shown). The frame 102 may be made from aluminum or other suitable material(s). Additionally, the frame 102 may be made by an extrusion process. The frame 102 of the solar module 100 has several functions. Among the features are that the frame 102 provides edge protection for the laminate 120. More specifically, the frame 102 protects the edge of the laminate 120 from direct impact during shipping and/or installation, which protects the edge from cracking, and minimizes any water penetration into the laminate 120 (e.g., between the front and back covers 126, 130). Also, the frame 102 enhances the mechanical stiffness of the solar module 100, which limits laminate 120 flexing due to, for example, extreme winds and/or heavy snow loads, which may otherwise cause breakage of the module 100. Further, the frame 102 provides a mounting interface such that the module 100 may be mounted to a plurality of surfaces (e.g., a roof of a building, a ground structure, a pole, etc.).

The frame 102 of the solar module 100 also provides two additional functions: a human interface function and a cable management function. More specifically, the frame 102 may provide a human interface function such that handlers of the solar module 100 (e.g., installers) may carry, lift, position, and/or install the solar module 100 without putting undue stress on the laminate 120, reducing the risk of damage. However, as shown in FIG. 1, edges 110, 112 of the frame 102 are sharp, and the mounting flange 108 is thin and sharp and thereby "blade-like." Unfortunately, the edges 110, 112 and the mounting flange 108 provide a grip region for the handlers of the solar module 100, which is uncomfortable at best and may be dangerous at worst, encouraging fatigue in the hands and presenting a potential for accidents if improperly handled.

The PV module frame 102 may also provide a cable management function such that the wires and cables that run to and from the laminate 120 may be housed along the body 104 of the frame 102. As described above, a frame should facilitate retention of wires and cables, including DC cables for connecting the laminate 120 to other PV modules, or, in an AC PV module, AC cables for connecting to other AC PV modules. The frame 102 shown in FIG. 1 may only facilitate such retention using additional cable management implements (not shown), such as zip ties and/or metal clips, which an installer may use to secure a length of cable to the mounting flange 108 and/or the body 104 of the frame 102.

Figure 2A:
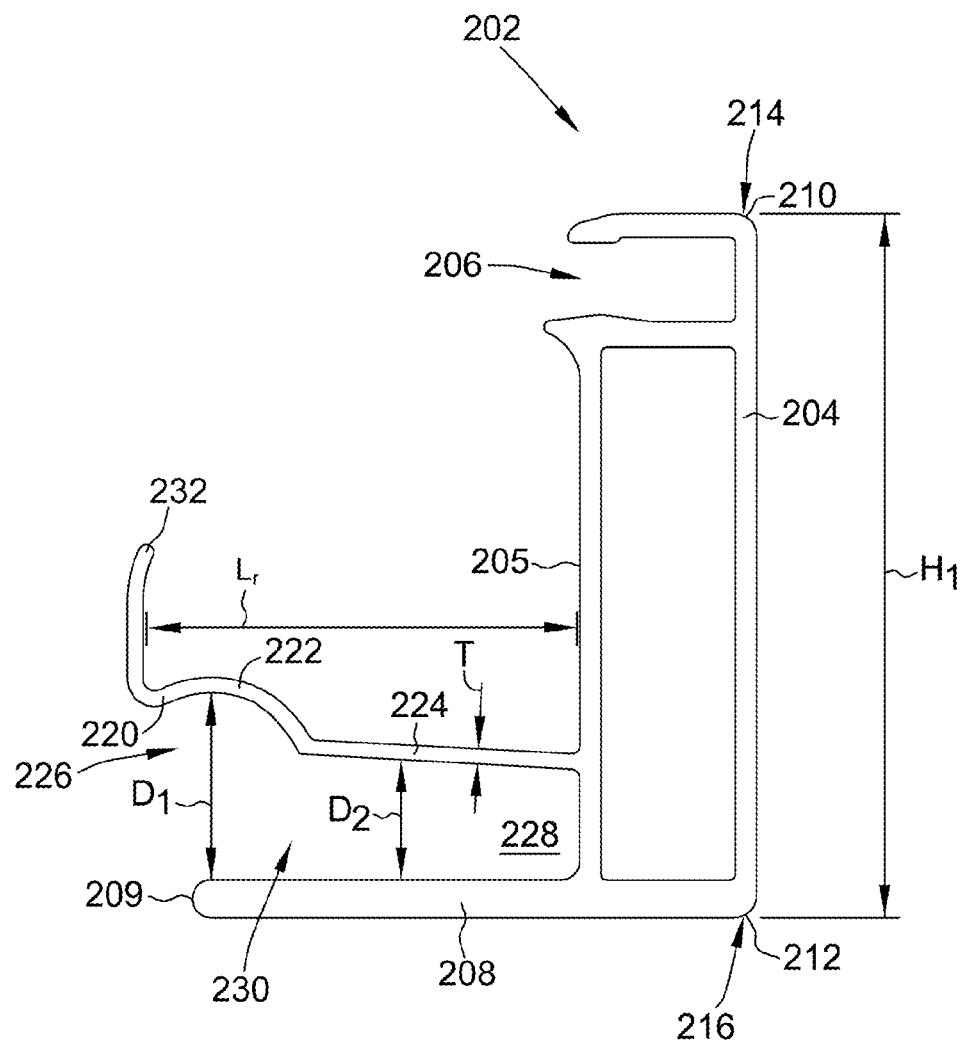
FIG. 2A is a schematic view of an ergonomic solar module frame in accordance with one embodiment of the present disclosure.
Figure 2B:
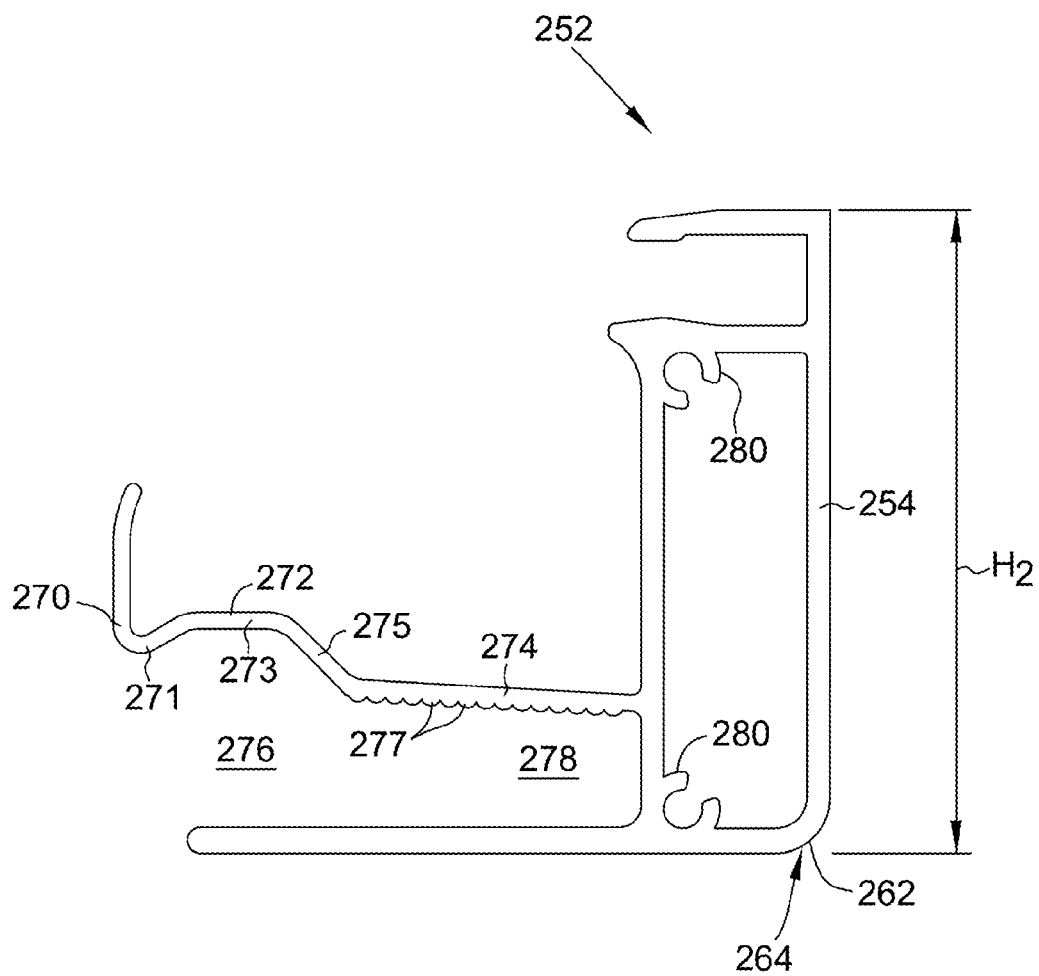
FIG. 2B is a schematic view of a first alternative embodiment of an ergonomic solar module frame.

Referring now to FIGS. 2A and 2B, schematic views of an example ergonomic PV module frame including a cable management flange is shown. More specifically, FIG. 2A shows an ergonomic solar module frame 202 including a frame body 204, an upper cavity 206, and a mounting flange 208. The frame body 204 includes an interior surface 205, an exterior surface 207, a first end 211 (shown in FIG. 3), and a second end 213 (shown in FIG. 3). In the example embodiment, the frame body 204 has a height $H_1$ that may measure between about 35 mm to about 50 mm. The frame 202 also includes rounded edges 210, 212, such that the frame 202 may be more comfortable and secure to grip. Each rounded edge 210, 212 may be defined by a corresponding arc 214, 216. For example, the edge 212 between the frame body 204 and the mounting flange 208 may be defined by an arc 216, wherein the arc is defined by a radius of about 0.0625 in to about 0.375 in, in one embodiment. In the example embodiment of FIG. 2A, edges 210 and 212 are rounded. However, it should be understood that only one of the edges may be rounded, or more edges may be rounded, without departing from the scope of the disclosure. Providing the rounded edges 210, 212 facilitates retention of all primary functions of the frame 202, including edge protection, mechanical stiffness, and a mounting interface, while enhancing the human interface function for easier and safer handling. Additionally, mounting flange 208 is rounded at a distal end 209, further enhancing the ergonomics of the frame 202. In various other embodiments, mounting flange 208 may be shaped and/or sized differently (e.g., may be generally arcuate in shape).

The frame 202 further includes a cable management flange 220 integrally formed with the body 204 of the frame 202. In the example embodiment, the cable management flange 220 extends from an interior surface 205 of the frame body 204. The cable management flange 220 includes a first retention section 222 and a second retention section 224. The mounting flange 208 and the first retention section 222 generally define a first cable region 226 therebetween. The first cable region 226 is sized and shaped to retain, for example, an AC cable of a microinverter therein. Accordingly, a distance $D_1$ between the mounting flange 208 and the first retention section 222 of the cable management flange 220 may be substantially equal to or greater than a diameter of an AC cable. For example, $D_1$ may measure between about 0.18 inches and about inches. In the example embodiment, the first retention section 222 is generally arcuate in shape, but it should be understood that the first retention section 222 may have any shape that allows the first retention section 222 and/or the entire cable management flange 220 to function as described herein. For example, the first retention section 222 may be generally elliptical, trapezoidal, rectangular, or triangular in shape.

The mounting flange 208 and the second retention section 224 of the cable management flange 220 generally define a second cable region 228 therebetween. The second cable region 228 is configured to retain, for example, one or more DC cable(s) therein. Accordingly, a distance $D_2$ between the mounting flange 208 and the second retention section 224 of the cable management flange 220 may be substantially equal to or greater than a diameter of a DC cable. For example, $D_2$ may measure between about 0.2 inches and about 0.4 inches. Although the first and second cable regions 226, 228 are described for retaining AC and DC cables, respectively, it should be understood that the first and second cable regions 226, 228 may be configured to retain either or both AC and/or DC cables therein without departing from the scope of the disclosure. Accordingly, the first and second cable regions 226, 228 may be collectively referred to as a "cable cavity" 230.

In addition, the cable management flange 220 includes a tab 232 configured to function as an additional hand grip for a handler or installer. For example, when the hand grips the frame 202, at least a part of at least one finger of the hand may rest on or otherwise engage with the tab 232. The tab 232 may be substantially rigid, such that it may withstand a pushing force exerted against the tab 232 by the hand and/or finger, which may provide a more secure and/or fixed grip. The tab 232 further spreads a gripping pressure across a larger surface of the hand, as compared to conventional frames in which pressure is concentrated on the fingers at the mounting flange. As used herein, "rigid" refers to a substantially unbending and/or unyielding material configured to retain its shape and position against a force exerted thereon.

In the example embodiment, the tab 232 is oriented generally parallel to the body 204 of the frame 202. In alternative embodiments, the tab 232 may be oriented at any angle relative to the body 204 of the frame 202 and/or to the mounting flange 208 without departing from the scope of the disclosure. For example, in one embodiment, the tab 232 may be oriented at an acute angle with respect to the mounting flange 208, which may enable further curvature of the fingers around the frame 202. In the example embodiment, the tab 232 may measure greater than or equal to about 0.125 inches.

In the example embodiment, the cable management flange 220 has a retention length $L_r$, taken from the interior surface 205 of the body 204 to a distal end of the first retention section 222, such that $L_r$ does not include the tab 232. $L_r$ may measure between about 0.25 inches to about 2 inches. In the example embodiment, the cable management flange 220 has a thickness T of about inches. In other embodiments, the thickness T may be any other thickness that enables the cable management flange 220 to function as described herein, for example, from about 0.03 inches to greater than about 0.045 inches. In addition, although the cable management flange 220 is shown to have a uniform thickness T in the example embodiment, in alternative embodiments the cable management flange 220 may have a varying thickness T along length $L_r$. The cable management flange 220 may be rigid, to enhance the retention capabilities by improving, for example, a friction fit with cable(s) inserted into the cable cavity 230. Alternatively, the cable management flange 220 may be flexible, such that the cable management flange 220 may more readily accept and retain cables having differing diameters. "Flexible" may refer to a material configured to bend and/or yield against a force exerted thereon but that may return to its initial position and/or shape after the force is terminated.

Although in the example embodiment, the cable management flange 220 extends beyond the distal end 209 of the mounting flange 208 with respect to the frame body 204, it should be understood that the cable management flange 220 may have other configurations with respect to the mounting flange 208.

The frame 202 may be formed by an extrusion process, such that the cable management flange 220 is an integral feature of the frame 202. In alternative embodiments, the cable management flange 220 may be coupled to the frame 202 after a frame extrusion process. The cable management flange 220 is configured to eliminate the need for additional wire and/or cable management implements such as zip ties and/or metal clips, and for additional machining. By replacing zip ties with an integral flange 220, the longevity of the cable management function of the frame 202 is greatly extended. For example, zip ties may only last about two to five years before they wear out and/or fail, whereas the cable management flange 220 is configured to sustain up to about 25 years of use. In addition, by replacing the additional implements with an integral flange 220, on-site installation of the solar module is simplified, installation time is reduced, and on-site materials required for installation are reduced.

FIG. 2B depicts a first alternate embodiment of an ergonomic solar module frame 252. The frame 252 has a height $H_2$ that is depicted as less than height $H_1$ of the frame 202 shown in FIG. 2A (e.g., about 35 mm to about 40 mm). However, it should be understood that $H_2$ may be substantially less than, equal to, or greater than $H_1$. The frame 252 includes only one rounded edge 262, although, as described above, the frame 252 may have fewer or more rounded edges without departing from the scope of the disclosure. Rounded edge 262 additionally features a more pronounced arc 264. In addition, the frame 252 includes an alternate embodiment of a cable management flange 270. The first retention section 272 of the cable management flange 270 is generally trapezoidal in shape, including three substantially linear sub-sections 271, 273, and 275. The shape of the first retention section 272 may facilitate enhanced adaptability of a first cable region 276 to cable(s) of varying diameters. The second retention section 274 includes a plurality of ridges 277. The plurality of ridges 277 may enhance the retention capability (e.g., a friction fit) between one or more cable(s) in a second cable region 278.

Moreover, the frame 252 includes two screw bosses 280 within an interior cavity of the frame body 254. The screw bosses 280 facilitate mating of two sections of the frame 252 with one another. The screw bosses 280 may be integrally formed with the frame body 254, such as by extrusion. Alternatively, the screw bosses 280 may be coupled to the frame body 254 by any other process, including, for example, molding-in, press-fitting, ultrasonic coupling, and/or thermal coupling. It should be understood that the frame 252 may include more, fewer, or no screw bosses 280 without departing from the scope of the present disclosure.

Figure 2C:
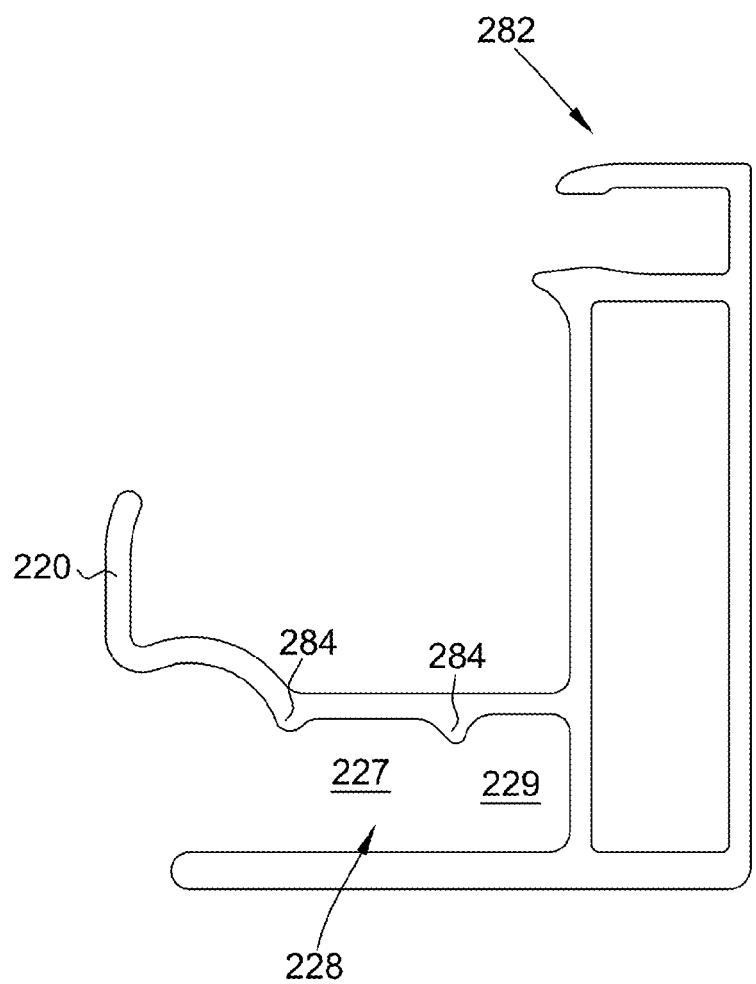
FIG. 2C is a schematic view of a second alternative embodiment of an ergonomic solar module frame.

FIG. 2C depicts a second alternate embodiment of an ergonomic solar module frame 282. The frame 282 includes two nodes 284 disposed on the cable management flange 220. The nodes 284 define two sub-regions in the second cable region 228, namely a first sub-region 227 and a second sub-region 229. The sub-regions 227, 229 are shaped and sized to receive and retain wires of differing diameters, which may enhance the cable management function of the cable management flange 220. Although two nodes 284 are depicted, fewer, more, or no nodes 284 may be disposed on the cable management flange 220 in alternate embodiments.

Figure 2D:
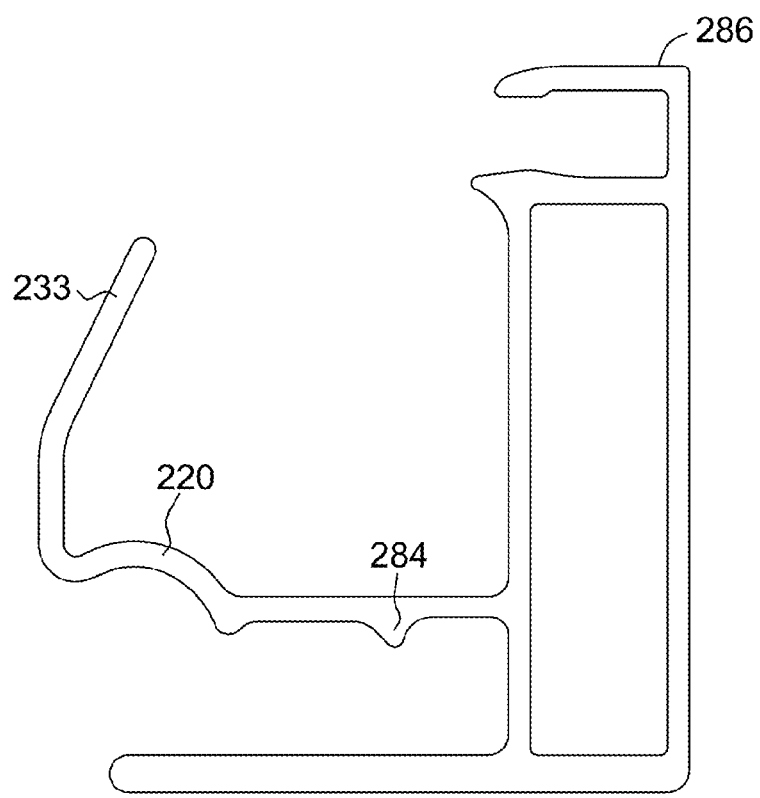
FIG. 2D is a schematic view of a third alternative embodiment of an ergonomic solar module frame.

FIG. 2D depicts a third alternate embodiment of an ergonomic solar module frame 286. The frame 286 includes nodes 284 (as shown in FIG. 2C) as well as an elongated tab 233. The elongated tab 233 is elongated relative to the tab 232 (as shown in FIG. 2A), which may provide enhanced ergonomics for a handler of the frame 286. The elongated tab may measure greater than 0.125 inches, extending up to about a bottom surface of the laminate (e.g., laminate 120, shown in FIG. 1). In the example embodiment, the elongated tab may measure for example, about 0.15-0.25 inches.

Figure 2E:
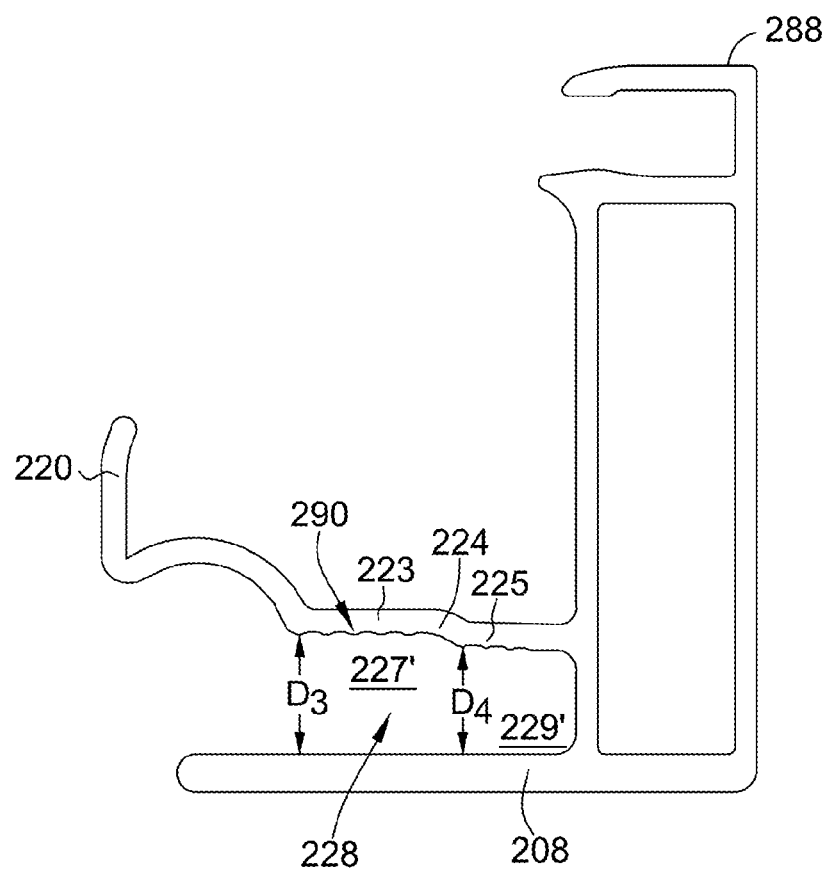
FIG. 2E is a schematic view of a fourth alternative embodiment of an ergonomic solar module frame.

FIG. 2E depicts a fourth alternate embodiment of an ergonomic solar module frame 288. The frame 288 includes a cable management flange 220, as described above, including ridges 290 disposed on the second retention section 224. The ridges 290 may be similar to ridges 277, as shown in FIG. 2B. In addition, the second retention section 224 includes two sub-sections, namely a first sub-section 223 and a second sub-section 225, which define a first sub-region 227' and a second sub-region 229' of the second cable region 228. The prime (') denotes a variation, as the first sub-region 227' is a variation of the first sub-region 227 (shown in FIG. 2C), and the second sub-region 229' is a variation of the second sub-region 229 (also shown in FIG. 2C).

In the example embodiment, a distance $D_3$ between the first sub-section 223 and the mounting flange 208 (a height of the first sub-region 227') may be substantially equal to or greater than a diameter of a first DC cable (not shown). $D_3$ may be substantially equal to, greater than, or less than $D_2$ (shown in FIG. 2A). Additionally, a distance $D_4$ between the second sub-section 225 and the mounting flange 208 (a height of the second sub-region 229') may be substantially equal to or greater than a diameter of a second DC cable (not shown). In the example embodiment, $D_4$ is less than M.

It should be understood that the various features and aspects of the frames 202, 252, 282, 286, 288 shown in FIGS. 2A-2E may be interchangeable with one another such that a single frame may include aspects of any of frames 202, 252, 282, 286, 288 alone or in combination, without departing from the scope of the present disclosure. The frames 202, 252, 282, 286, 288 may be adapted for use in various applications, including, for example, AC solar modules and/or DC solar modules in residential roof mounting and/or commercial flat roof mounting.

Figure 3:
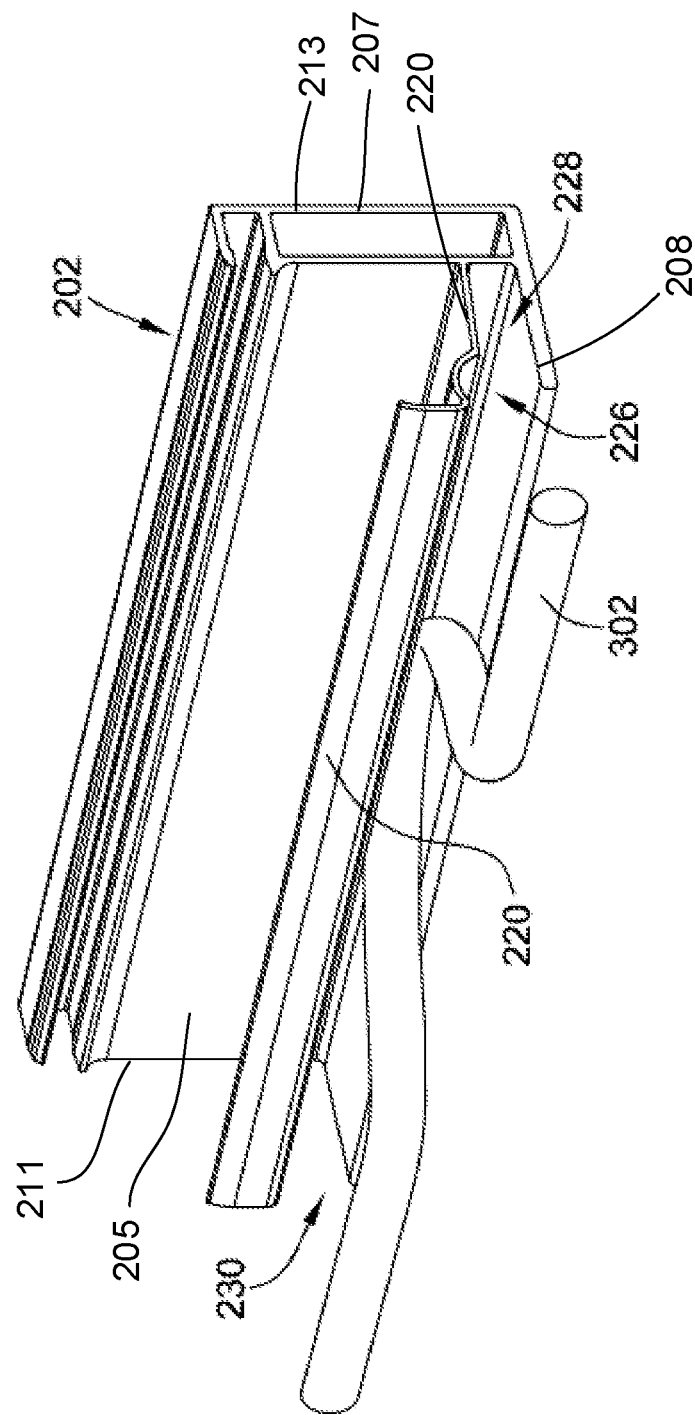
FIG. 3 is a perspective view of the solar module frame shown in FIG. 2A including a cable.
Figure 4:
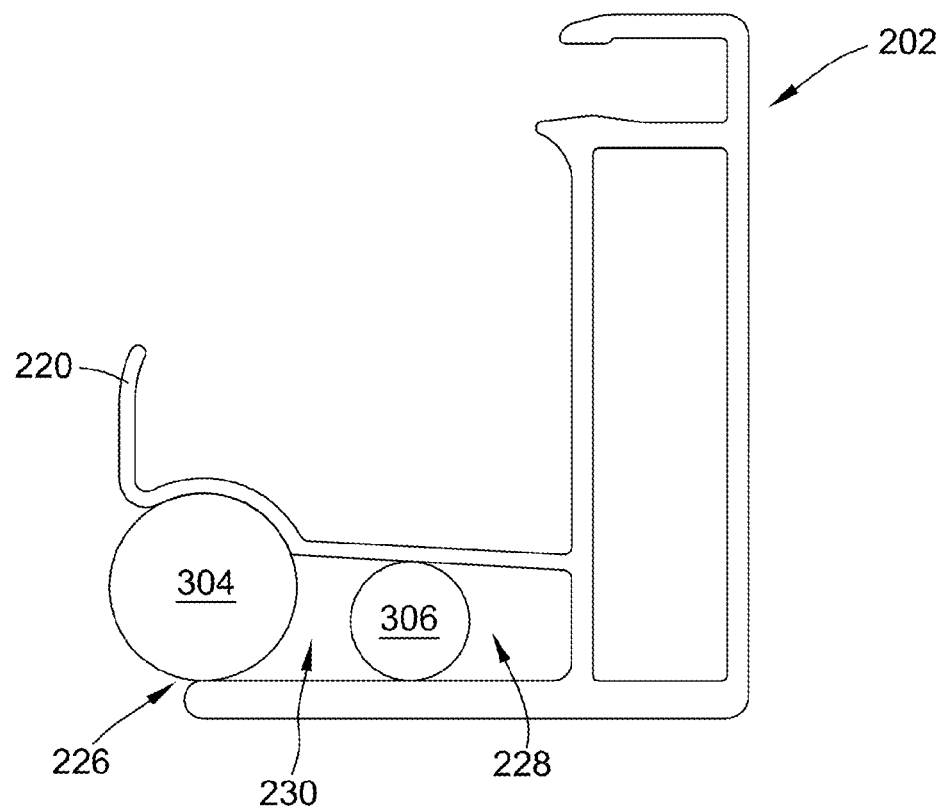
FIG. 4 is a schematic view of the solar module frame shown in FIG. 2A including two cables.

FIGS. 3 and 4 show the cable management function of the frame 202 shown in FIG. 2A. More particularly, FIG. 3 shows a perspective view of the frame 202 including a cable 302, and FIG. 4 shows a schematic view of the frame 202 including two cables 304, 306. As best seen in FIG. 3, insertion of the cable 302 into the cable cavity 230 is relatively simple. At least a part of the cable 302 need only be inserted into the cable cavity 230 until the cable 302 is engaged with and/or retained in one of the first and second cable regions 226, 228. As shown in FIG. 4, the cable management flange 220 may accommodate and retain at least two cables 304, 306 simultaneously. More specifically, the cable cavity 230 is shown retaining an AC cable 304 in the first cable region 226 and a DC cable 306 in the second cable region 228. In other embodiments of this disclosure, the frame may be configured to manage, for example and without limitation, home run cables, rack-mounted microinverter cables, frame-attached microinverter cables, microinverter trunk cables, and/or DCPM cables that are not part of an attached AC module.

As best seen in FIG. 3, the cable management flange 220 and the mounting flange 208 extend along a length of the body 204 from the first end 211 to the second end 213. The cable management flange 220 and the mounting flange 208 are continuous between the first end 211 and the second end 213 (i.e., the cable management flange 220 and the mounting flange 208 are free of any openings or gaps along their extension). As a result, the cable management flange 220 and the mounting flange 208 facilitate securing the cables along the entire length of the frame or at any locations along the length of the frame. In addition, the cable management flange 220 and the mounting flange 208 reduce the risk of damage to the cables and prevent the cables becoming unsecured such as occurs when zip ties, metal clips, or other conventional attachment means are used to secure cables to the module frame.

Figure 5:
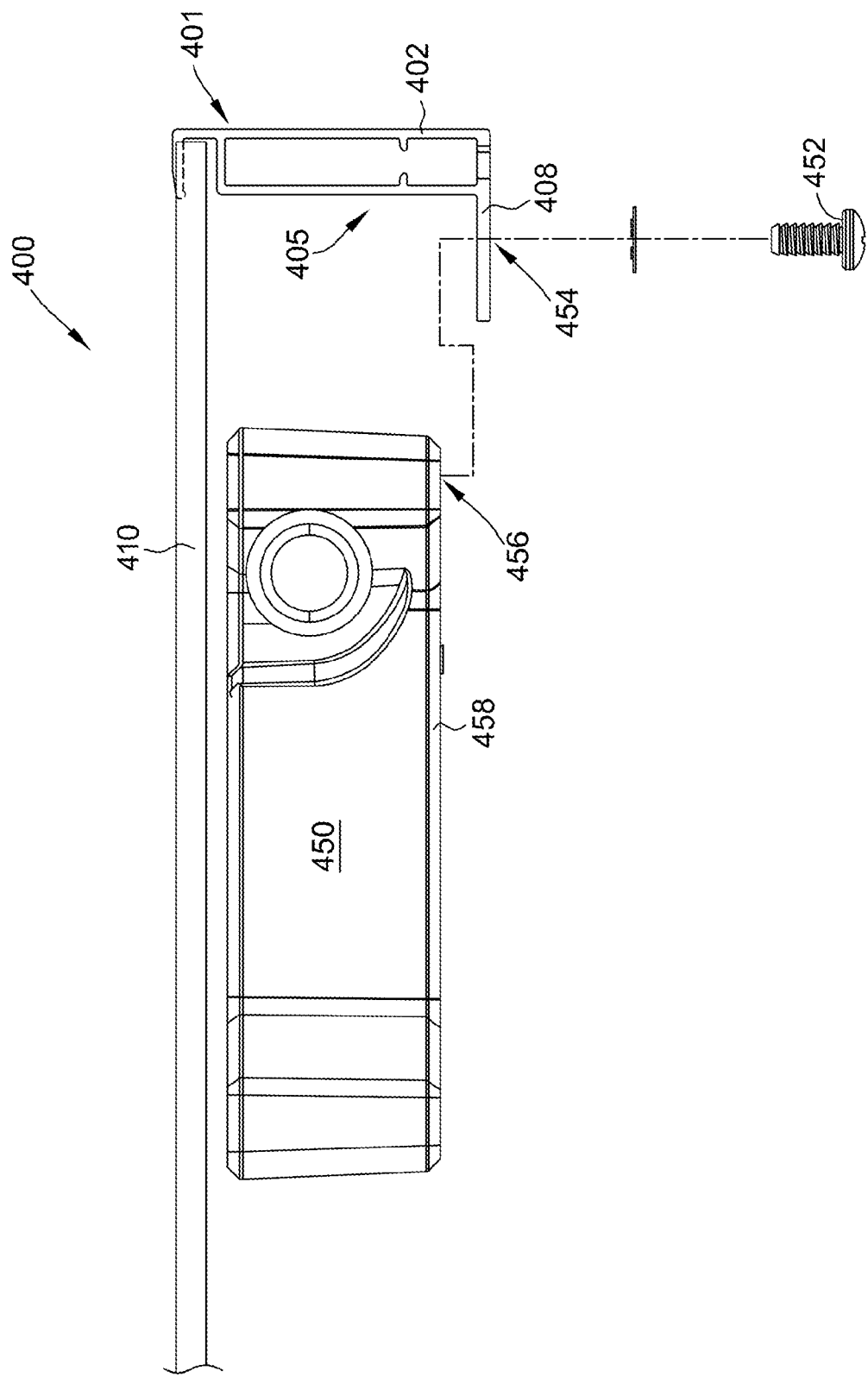
FIG. 5 shows a prior art microinverter frame attachment installation method.

Referring now to FIG. 5, a conventional microinverter frame attachment installation method 400 is depicted. A solar module collects solar energy and converts it into a useable form of energy, for example, in a person's home or business. As many appliances and machines function using AC, solar modules include an inverter, which converts DC into the useable AC. Single modules may employ a microinverter for each module (as opposed to a central inverter connected to an entire array of modules). There are at least three known methods for attaching a microinverter to a solar module frame. A first is a "fully integrated" installation method, in which the microinverter is pre-installed on a solar panel and replaces any existing module junction box. A second is a "frame-attached" installation method, in which the microinverter is installed by attaching the microinverter to the frame. Frame-attached installation of the microinverter may be performed during installation of the module onto the mounting structure (i.e., may be an "in the field" installation method). A third method is a "rack-attached" installation method, in which the microinverter is secured to the mounting structure, not the PV module frame. However, though the rack-attached method may be common in the market, such a rack-attached method is insufficient to create a complete AC PV module. An AC PV module must have the microinverter both physically (i.e., mechanically) and electrically connected to the PV module. Accordingly, one of the first two methods may be selected to create a complete AC PV module with the installation of the microinverter.

Of the fully integrated and frame-attached methods, the frame-attached method may be selected because, among other reasons, the frame-attached methods induces minimal disruption during manufacturing of a PV module, is amenable to on-site assembly, provides easier replacement of the microinverter should such a need arise, and requires no silicone adhesive curing time in a manufacturing environment (as in a fully integrated attachment method). As shown in FIG. 5, in at least some known implementations of the frame-attached method 400, a microinverter 450 is inserted or nested into a recess 405 defined by a laminate 410 and a mounting flange 408 of a conventional frame 402. The microinverter 450 is then attached to the mounting flange 408 using, for example, a fastener 452 such as a screw or a bolt threaded through pre-drilled holes 454 in the mounting flange 408 and into fastener seats 456 in a casing 458 of the microinverter 450. The frame-attached method 400 provides an effective ground bond for the microinverter 450 to the frame 402 and sufficiently prevents dislodging of the microinverter 450 under strong forces. In addition, the frame may provide a heat sink for the microinverter 450. The frame-attached method 400 may not require any specialized tools, as conventional fasteners 452 may be used.

However, for ergonomic frame 202, 252 featuring a cable management flange such as flanges 220, 270 shown in FIGS. 2A-2E, 3, and 4, the cable management flange eliminates the option of installing a microinverter 450 into a recess defined by a laminate and the mounting flange 208. Not only does the cable management flange 220, 270 divide the recess into regions too shallow to receive the microinverter 450, but the mounting flange 208 is inaccessible to fasteners from a top region of the recess through the cable management flange 220, 270. Accordingly, there is a need for a frame-attached method of microinverter installation to the frame 202, 252 shown in FIGS. 2A-2B that maintains an effective ground bond and ensures that the microinverter will remain attached to the frame 202, 252 during exertion of strong forces (e.g., during handling). An effective ground bond, generally, includes maintaining the integrity of the materials (e.g., no galvanic corrosion) and not be compromised under a full range of conditions (e.g., temperature cycles, humidity, freezes, vibration, etc.).

Figure 7:
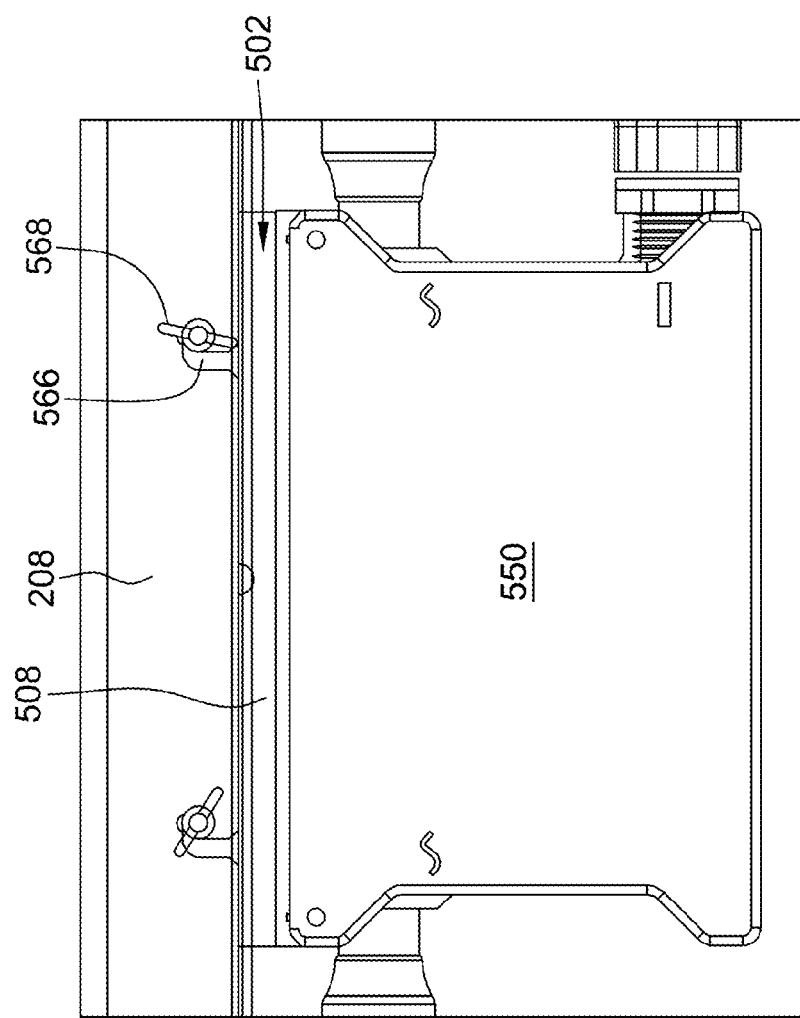
FIG. 7 is a bottom plan view showing "J"-shaped pre-cut installation slots for the installation shown in FIG. 6.
Figure 8:
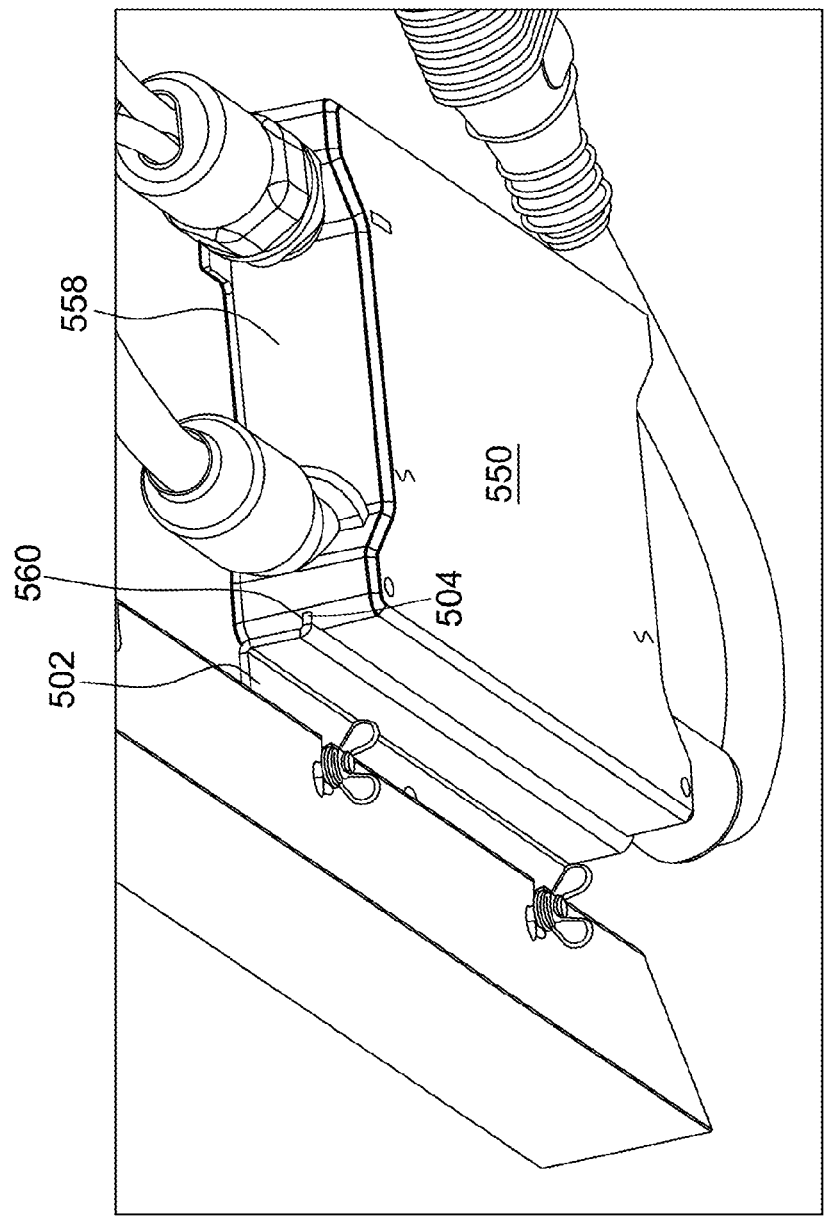
FIG. 8 is a second perspective view showing an alternative embodiment of the microinverter installation shown in FIG. 6.

FIGS. 6-8 show a first example of a microinverter-attachment adapter 502 configured for use with the solar module frame 202 shown in FIG. 2A. More specifically, FIG. 6 is a first perspective view showing the installation of a microinverter using the adapter 502; FIG. 7 is a bottom plan view showing "J"-shaped pre-cut installation slots; and FIG. 8 is a second perspective view showing an alternative embodiment of the microinverter installation. For clarity, reference will be made herein to the frame 202 shown in FIG. 2A, but it should be understood that the discussion herein may be related to alternate embodiments of the frame 202. The adapter 502 includes a microinverter attachment projection 504, a side wall 506, and a frame attachment extension 508. The adapter 502 situates a microinverter 550 in a position further spaced-apart from the body 204 of the frame 202, such that the microinverter 550 does not contact nor interfere with the cable management flange 220.

In the example embodiment, the microinverter attachment projection 504 may be coupled to the microinverter 550 using conventional attachment methods. For example, at least one fastener 552 (e.g., a screw or bolt) may be threaded through a pre-drilled hole 554 in the microinverter attachment projection 504 and into exiting fastener seat(s) in a casing 558 of the microinverter 550, as shown in FIG. 6. Alternatively, as shown in FIG. 8, the microinverter casing 558 may include a locking slot 560 configured to receive the microinverter attachment projection 504 therein, thereby substantially reducing the time required to attach the projection 504 into the locking slot 560.

Subsequently, the frame attachment extension 508 may be overlaid on or otherwise coupled to the mounting flange 208 of the frame 202. For example, the frame attachment extension 508 may include pre-drilled holes 562 that are configured to align with pre-drilled holes (not shown) in the mounting flange 208 and/or with pre-cut slots 564, 566 (shown in FIG. 7) in the mounting flange 208. The holes in the extension 508 may then be aligned with the holes in the mounting flange 208, and a conventional fastener 568 (e.g., a screw, a nut and a bolt, a wingnut, or press-in fasteners) may be used to couple the extension 508 to the mounting flange 208. Alternatively, the fastener 568 may be coupled to the frame attachment extension 508 and aligned with the pre-cut slots 566 in the mounting flange 208. As depicted in FIG. 6, the slots 564 may be substantially linear, or as shown in FIG. 7, the slots 566 may be substantially "J"- or "L"-shaped, to enhance the coupling of the adapter 502 to the frame 202, further preventing the adapter 502 from being dislodged after installation. Alternatively, the slots 564, 566 may have any other shape. The frame attachment extension 508 may then be simply slid into place against the mounting flange 208, and the fastener(s) 568 may be suitably tightened to couple the adapter 502 to the mounting flange 208.

Accordingly, no specialized tools or fasteners are required to install and use the adapter 502 and the frame 202. The frame-attachment installation method using the adapter 502 may require only the additional step of attaching the adapter 502 to the microinverter 550, which may be performed prior to installation, reducing in-field installation time to substantially the same time required to install microinverters onto conventional frames. In the example embodiment, the adapter 502 is made of a suitable conductive material to maintain an effective ground bond of the microinverter 550 with the frame 202 (such as, for example, stainless steel). Additional elements, such as a toothed washer integral with or coupled to the frame attachment extension fasteners 568, may further secure the ground bond connection.

It should be appreciated that the adapter 502 shown in FIGS. 6-8 is not limited for use with any or all of the frames 202, 252, 286, 288 shown in FIGS. 2A-2E. In particular, manufacturers of traditional solar panel frames may be interested in reducing the height of the body of the frame, in order to save manufacturing costs (i.e., the cost of materials). Using conventional frame-attached microinverter installation methods, a reduction in frame body height is limited to a height of the microinverter, as the microinverter must fit into the recess defined by a mounting flange and a laminate (see FIG. 5). Using the adapter 502 shown in FIGS. 6-8, the frame body height may be additionally reduced, as the microinverter is positioned lower with respect to the laminate and the mounting flange.

Figure 9:
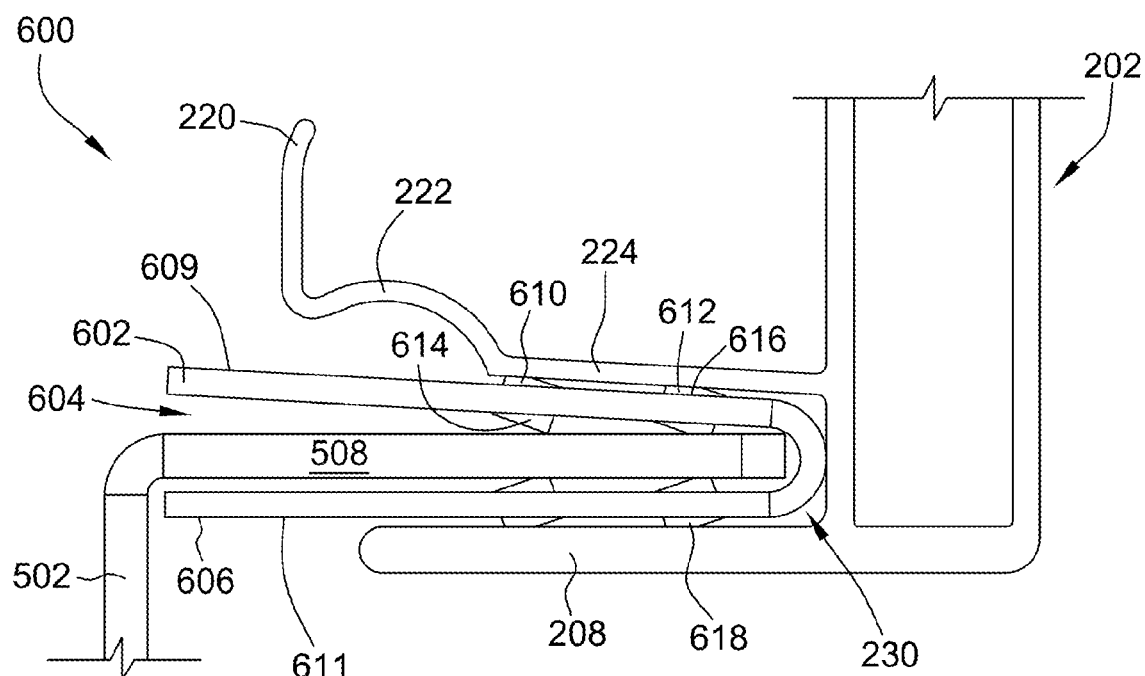
FIG. 9 shows a schematic view of an adapter assembly installed in the frame shown in FIG. 2A.
Figure 10A:
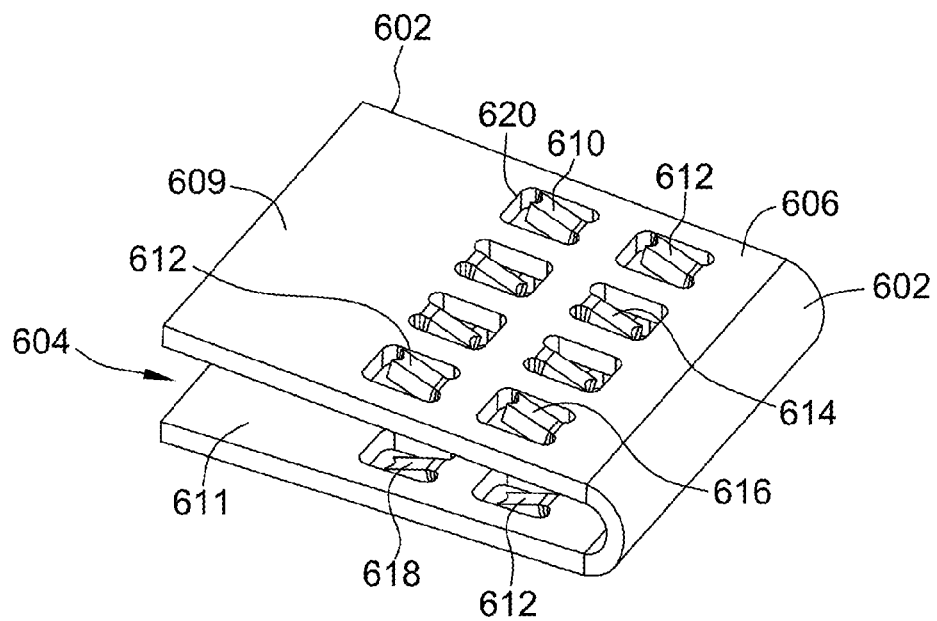
FIG. 10A shows a first embodiment of an adapter sheath for use with the adapter assembly shown in FIG. 9.
Figure 10B:
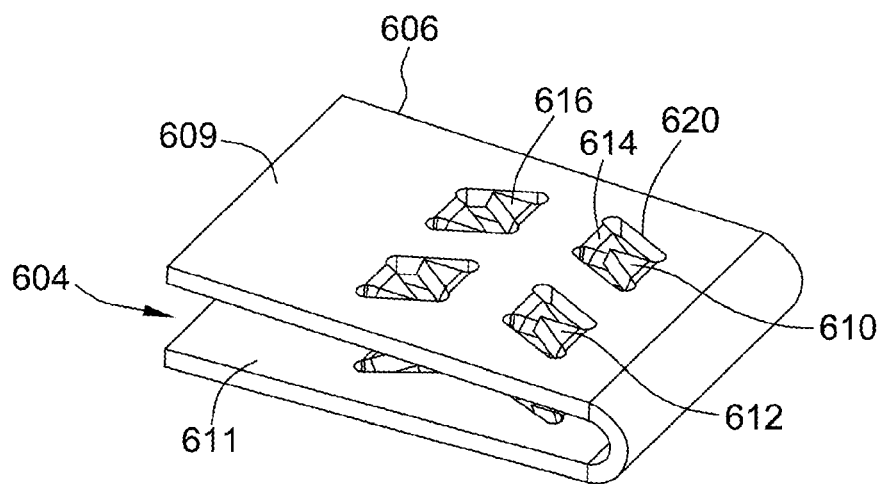
FIG. 10B shows a second embodiment of an adapter sheath for use with the adapter assembly shown in FIG. 9.

FIGS. 9 and 10A-10B show an alternative microinverter attachment adapter assembly 600 configured for use with the solar module frame 202 shown in FIG. 2A. More specifically, FIG. 9 shows a schematic view of an installed adapter assembly 600; and FIGS. 10A-10B show alternative embodiments of an adapter sheath 602. For clarity, reference will be made herein to the frame 202 shown in FIG. 2A, but it should be understood that the discussion herein may be related to alternate embodiments of the frame 202. As best seen in FIG. 9, the adapter assembly 600 includes an adapter 502, as shown and described with respect to FIGS. 6-8. Alternatively, the adapter assembly 600 may function with a microinverter having a frame attachment extension similar to extension 508 formed in the casing thereof. The adapter assembly 600 further includes an adapter sheath 602. The adapter sheath 602 includes an interior cavity 604, an exterior surface 606, and a plurality of locking tabs 610 defined therein. The plurality of locking tabs 610 may be "barb-like" and be oriented in different directions, as described further below.

In the example embodiment, about half of the locking tabs 610 are oriented outward with respect to the interior cavity 604 ("exterior locking tabs" 612), and about half of the locking tabs 610 are oriented inward ("interior locking tabs" 614). It should be understood that, though a 1:1 ratio between exterior locking tabs 612 and interior locking tabs 614 is depicted in FIGS. 10A and 10B, any other ratio between exterior locking tabs 612 and interior locking tabs 614 may be used without departing from the scope of the present disclosure. Moreover, about half of the locking tabs 610 are defined in a top wall 609 of the adapter sheath 602 ("top locking tabs"), and about half of the locking tabs 610 are defined in a bottom wall 611 of the adapter sheath 602 ("bottom locking tabs"). It should be understood that, though a 1:1 ratio between top locking tabs and bottom locking tabs is depicted in FIGS. 10A and 10B, other suitable ratios between top and bottom locking tabs may be used without departing from the scope of the present disclosure. In the example embodiments of FIGS. 10A and 10B, about a quarter of the locking tabs 610 are "exterior top locking tabs" 616, another quarter of the locking tabs 610 are "exterior bottom locking tabs" 618, and the balance are interior locking tabs 614. It should be understood that there may be more or fewer of any of exterior top locking tabs 616, exterior bottom locking tabs 618, and/or interior locking tabs 614 defined in adapter sheath 602 without departing from the scope of the present disclosure. For example, in alternative embodiments, there may be as few as one interior locking tab 614 and one exterior locking tab 612, or as many as n exterior and/or interior locking tabs 612, 614.

FIG. 10A depicts a first embodiment of the adapter sheath 602, wherein each locking tab 610 is defined within a corresponding single cutout 620. FIG. 10B depicts a second embodiment of the adapter sheath, wherein each cutout 620 includes both an exterior locking tab 612 and an interior locking tab 614 defined therein. In various other embodiments, a combination of the two configurations may be used, and/or any other configuration of exterior locking tabs 612 and interior locking tabs 614.

Returning to FIG. 9, the interior locking tabs 614 of the adapter sheath 602 are configured to engage with the frame attachment extension 508 of the adapter 502. The interior locking tabs 614 may be configured to engage at least one pre-drilled hole 562 in the frame attachment extension 508 (shown in FIG. 6). Alternatively or additionally, the frame attachment extension 508 of the adapter 502 may include one or more additional engagement zones (not shown; e.g., openings, cutouts, ridges, locking slots, grooves, etc.) to receive and/or engage the interior locking tabs 614.

The exterior locking tabs 612 of the adapter sheath 602 are configured to engage with the frame 202. More specifically, the exterior bottom locking tabs 618 are configured to engage with the mounting flange 208 of the frame 202. The exterior bottom locking tabs 618 may be configured to engage one or more pre-drilled holes and/or pre-cut slots 564, 566 (shown in FIGS. 6 and 7) in the mounting flange 208. Alternatively or additionally, the mounting flange 208 may include one or more additional engagement zones (not shown; e.g., openings, cutouts, ridges, locking slots, grooves, etc.) to receive and/or engage the exterior bottom locking tabs 618. The exterior top locking tabs 616 are configured to engage with the first and/or second retention section(s) 222, 224 of the cable management flange 220 of the frame 202 (e.g., within a section of the cable cavity 230 without cable(s) retained therein). The exterior top locking tabs 616 may be configured to engage the plurality of ridges 277 (as shown in FIG. 2B) in the second retention section 224. Alternatively or additionally, the cable management flange 220 may include one or more additional engagement zones (not shown; e.g., openings, cutouts, ridges, locking slots, grooves, etc.) to receive and/or engage the exterior top locking tabs 616.

The adapter assembly 600 may be installed by inserting the adapter 502 into the adapter sheath 602 to form the adapter assembly 600, and subsequently inserting the adapter assembly 600 into the cable cavity 230. Alternatively, the adapter sheath 602 may be inserted into the cable cavity 230 prior to inserting the adapter 502 into the adapter sheath 602. Accordingly, no specialized tools nor fasteners may be required to install and use the adapter assembly 600, and few or no small parts may be necessary for installation of the adapter assembly 600 at the module installation site. In the example embodiment, the adapter assembly 600 is made of a suitable conductive material to maintain an effective ground bond with the frame (such as, for example, stainless steel).

FIGS. 11A-11I and FIGS. 12A-12C shows various additional embodiments of a solar module frame featuring cable management functionality. It should be understood that any of the features depicted in any one of FIGS. 2A-2E, FIGS. 11A-11I, and FIGS. 12A-12C may be combined with any of the features depicted in any other one(s) of FIGS. 2A-2E, FIGS. 11A-11I, and FIGS. 12A-12C.

Specifically, a frame 1102 shown in FIG. 11A illustrates a cable management flange 1104 with only a first retention section 1106, where a cable cavity 1108 does not have separately defined cable regions. Accordingly, the cable cavity 1108 may be suitably sized and/or shaped to receive one or both AC and DC cables therein.

FIG. 11B depicts the frame 1102 shown in FIG. 11A wherein the cable management flange 1104 includes a plurality of "teeth-like" nubs 1110. The plurality of nubs 1110 may enhance the retention capability of the cable cavity 1108 (e.g., a friction fit between the cable management flange 1104 and a cable). The plurality of nubs 1110 may also serve to define separate cable regions 1112, 1114, and 1116 within the cable cavity 1108. It should be understood that there may be more or fewer cable regions, based on the number of nubs 1110 defined on the cable management flange 1104. Each cable region 1112, 1114, 1116 may be similarly sized and/or shaped; one cable region 1112, 1114, or 1116 may be differently sized or shaped from the other of the cable regions 1112, 1114, 1116; or all cable regions 1112, 1114, and 1116 may be different in size and/or shape.

FIG. 11C shows a frame 1118 wherein a cable cavity 1120 is defined between a cable management flange 1122 and a lower laminate flange 1124. In other words, the cable cavity 1120 is located adjacent an upper cavity 1126 (configured to retain a laminate such as laminate 120, shown in FIG. 1). The lower laminate flange 1124 may extend further from a body of the frame 1118 than a conventional lower laminate flange (as pictured, though not referenced, in FIGS. 2A-2E) to better accommodate the cable cavity 1120. In the example embodiment, the cable management flange 1122 includes a first retention section 1128 and a second retention section 1130, similar in function to first and second retention sections 222, 224 shown in FIG. 2A. The first and second retentions sections 1128, 1130 may be suitably shaped to retain cable(s) (not shown) therein. Accordingly, the first and second retentions sections 1128, 1130 may be substantially arcuate, trapezoidal, linear, triangular, rectangular, or any other shape that enables the cable retention function described herein. It should be understood that where "arcuate" or "substantially arcuate" are used herein, the corresponding feature may be piecewise linear without departing from the scope of the disclosure.

The frame 1118 further includes a mounting flange 1132, wherein the mounting flange 1132 includes a tab 1134. The tab 1134 provides the ergonomic grip function described above with respect to, for example, the tab 232 in FIG. 2A. By shifting the cable management flange 1122 towards the upper cavity 1126, the cable management flange 1122 may no longer be in a position suitable to provide any ergonomic grip functionality. Accordingly, providing the tab 1134 on the mounting flange 1132 facilitates the alternate arrangement of the cable management flange 1122 without reducing or eliminating the ergonomic features and functions of the frame 1118. Moreover, the tab 1134 may further define a second cable cavity 1121 that extends between the tab 1134 and a body of the frame 1118. The second cable cavity 1121 may retain cable(s) (not shown) therein, wherein the tab 1134 prevents the cable(s) from sliding out of the frame 1118. In the example embodiment, the tab 1134 is substantially linear and extends substantially perpendicularly from a distal edge 1133 of the mounting flange 1132. The tab 1134 may be other shapes and/or orientations with respect to the mounting flange 1132 without departing from the scope of the present disclosure. In addition, the distal edge 1133 of the mounting flange 1132 from which the tab 1134 extends may be rounded, which further enhances the ergonomic grip feature of the frame 1118.

FIG. 11D shows a frame 1136 including a cable management flange 1138 with a first tab 1140. In contrast to, for example, the tab 232 shown in FIG. 2A, the first tab 1140 is substantially arcuate in shape and extends into a cable cavity 1142. Accordingly, the first tab 1140 may provide not only an ergonomic feature in that its curved shape may be more comfortable to hold, but may also define a first cable region 1144 in the cable cavity 1142 along an axis defined by the curvature of the first tab 1140. In addition, a mounting flange 1146 includes a second tab 1148 extending therefrom. As described above with respect to the tab 1134 shown in FIG. 11C, the second tab 1148 may provide a grip region for a handler of the frame 1136. The second tab 1148 may also further define the cable cavity 1142, thereby enhancing the cable retention function of the cable management flange 1138 by preventing cable(s) (not shown) retained therein from slipping out.

FIG. 11E shows a frame 1150 including a cable management flange 1152. The cable management flange 1152 includes a first section 1154 and a second section 1156, as well as a node 1158 defined on a distal end of the cable management flange 1152. The first section 1154 is substantially linear and extends at an angle from an edge 1160 between a body 1162 of the frame 1150 and a mounting flange 1164. The second section 1156 is generally arcuate in shape, such that the second section 1156 may retain a cable (not shown) therein, such as by a friction fit. The second section 1156 terminates in the node 1158, which may serve to enhance the cable retention function of the cable management flange 1152 by preventing a cable from dislodging from between the second section 1156 and the mounting flange 1164. In the example embodiment, the curved design of the cable management flange 1152 may provide an ergonomic grip region for a handler of the frame 1150, such that a hand may curve around the flange 1152 and rest thereupon during handling and installation of the frame 1150.

FIG. 11F shows a frame 1166 including a mounting flange 1168. The mounting flange 1168 includes a substantially arcuate tab 1170 extending therefrom, which, as described above with respect to tabs 1134 and 1148 (shown in FIGS. 11C and 11D, respectively), provides both a cable retention function and an ergonomic grip function. Specifically, the tab 1170 may prevent cable(s) that are positioned atop the mounting flange 1168 from slipping out. Accordingly, the tab 1170 may be considered a cable management flange 1170 in that the tab 1170 facilitates retention of cable(s) in the frame 1166. The curvature of the tab 1170 may also provide a more comfortable and safer grip region than a conventional, bladelike mounting flange (e.g., mounting flange 108, shown in FIG. 1).

FIG. 11G shows a first alternate embodiment of the frame 1166 (as shown in FIG. 11F) with the mounting flange 1168. In the example embodiment, a tab 1172 extends in a substantially semi-circular configuration from the mounting flange 1168. Accordingly, a cable cavity 1174 may be defined along on axis of the curvature of the tab 1172. The tab 1172 may be considered a cable management flange 1172 in that the tab 1172 facilitates retention of cable(s) in the frame 1166. The tab 1172, as described elsewhere herein, further provides an enhanced ergonomic grip for handler(s) of the frame 1166.

FIG. 11H shows a second alternate embodiment of the frame 1166 (as shown in FIG. 11F) with the mounting flange 1168. In the example embodiment, a tab 1176 extends from the mounting flange 1168. The tab 1176 is substantially arcuate and semi-circular in configuration and includes a cable management flange 1178 extending therefrom. The cable management flange 1178 is substantially linear but may have other shapes, sizes, and/or configurations as described elsewhere herein. A cable cavity 1180 is defined between the mounting flange 1168, the tab 1176, and the cable management flange 1178. The cable cavity 1180 may be sized and/or shaped to retain AC and/or DC cable(s) (not shown) therein. By arranging the cable management flange 1178 to extend from the mounting flange 1168, the cable retention function may be enhanced, as it would be difficult to dislodge a cable from the cable cavity 1180. In addition, the mounting flange 1168, tab 1176, and cable management flange 1178 provide an ergonomic grip region for handler(s) of the frame 1166. Although the tab 1176 is arcuate in the example embodiment, the tab 1176 may have other shapes, as described herein, without departing from the scope of the present disclosure.

FIG. 11I shows a third alternate embodiment of the frame 1166 (as shown in FIG. 11F) with the mounting flange 1168. In the example embodiment, a tab 1182 extends from a distal edge 1169 of the mounting flange 1168. The tab 1182 is substantially arcuate in shape to provide an ergonomic grip region for handler(s) of the frame 1166, but may have other shapes, as described herein, without departing from the scope of the present disclosure. A cable management tab 1184 extends from a body portion 1183 of the mounting flange 1168, wherein the body portion 1183 is defined generally between the distal edge 1169 of the mounting flange 1168 and a body 1167 of the frame 1166. In the example embodiment, the cable management tab 1184 is curved in an arc opposite the tab 1182 to define a "tear-drop"

shaped first cable cavity 1186 therebetween. The first cable cavity 1186 may have other shapes and/or sizes without departing from the scope of the present disclosure. Specifically, the first cable cavity 1186 may be sized and/or shaped to retain AC and/or DC cable(s) (not shown) therein. In addition, a second cable cavity 1188 is defined between the cable management tab 1184, the body portion 1183 of the mounting flange 1168, and the body 1167 of the frame 1166. The second cable cavity 1188 is also configured to retain AC and/or DC cable(s) (not shown) therein.

Figure 12A:
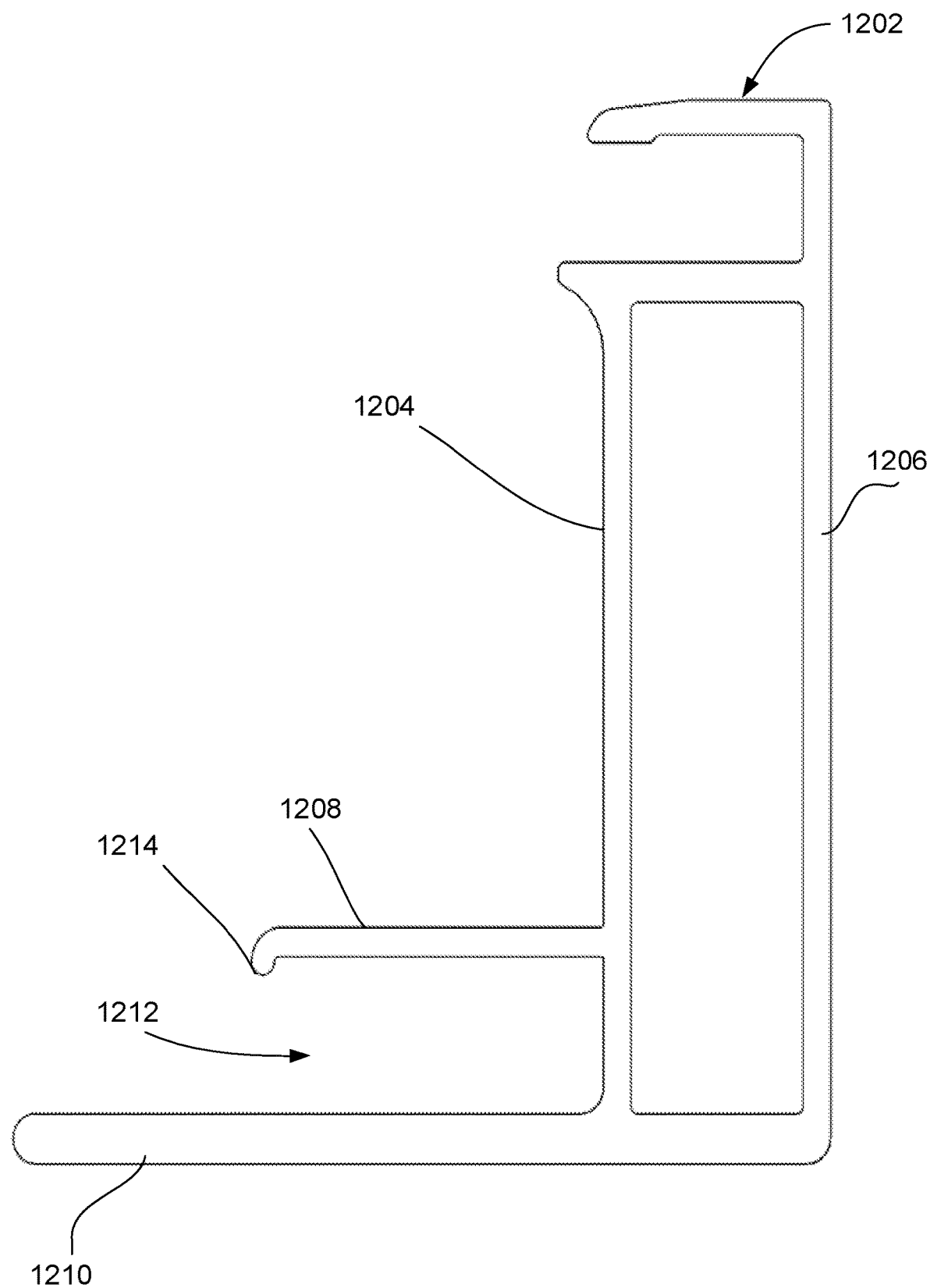
FIGS. 12A-12C show additional embodiments of a solar module frame featuring cable management functionality.

FIG. 12A shows a frame 1202 including an interior surface 1204, an exterior surface 1206, a cable management flange 1208, and a lower flange, e.g., a mounting flange, 1210. The cable management flange 1208 and the lower flange 1210 extend from the interior surface 1204 of the frame 1200. The cable management flange 1208 and the lower flange 1210 define a cable cavity 1212 therebetween. The cable management flange 1208 and the lower flange 1210 are spaced apart a distance that does not change along the extensions of the management flange 1208 and the lower flange 1210. The distance between the cable management flange 1208 and the lower flange 1210 may be equal to or less than a diameter of a cable such that the cable cavity provides an interference fit for the cable.

In addition, the interior surface 1204 extends in a vertical direction between the top and bottom of the frame 1202 and the cable management flange 1208 and the lower flange 1210 are each flat and extend from the vertical interior surface 1204 at approximately a 90° angle. Accordingly, the cable management flange 1208 and the lower flange 1210 extend parallel to each other and perpendicular to the interior surface 1204. In other embodiments, at least one of the cable management flange 1208 and the lower flange 1210 may extend at an oblique angle from the interior surface 1204.

The frame 1202 further includes a node 1214 disposed on the cable management flange 1208. The node 1214 is disposed on a lower surface of the cable management flange 1208 and extends toward the lower flange 1210. The node 1214 defines the cable retention region and retains the cable within the cable retention region.

Figure 12B:
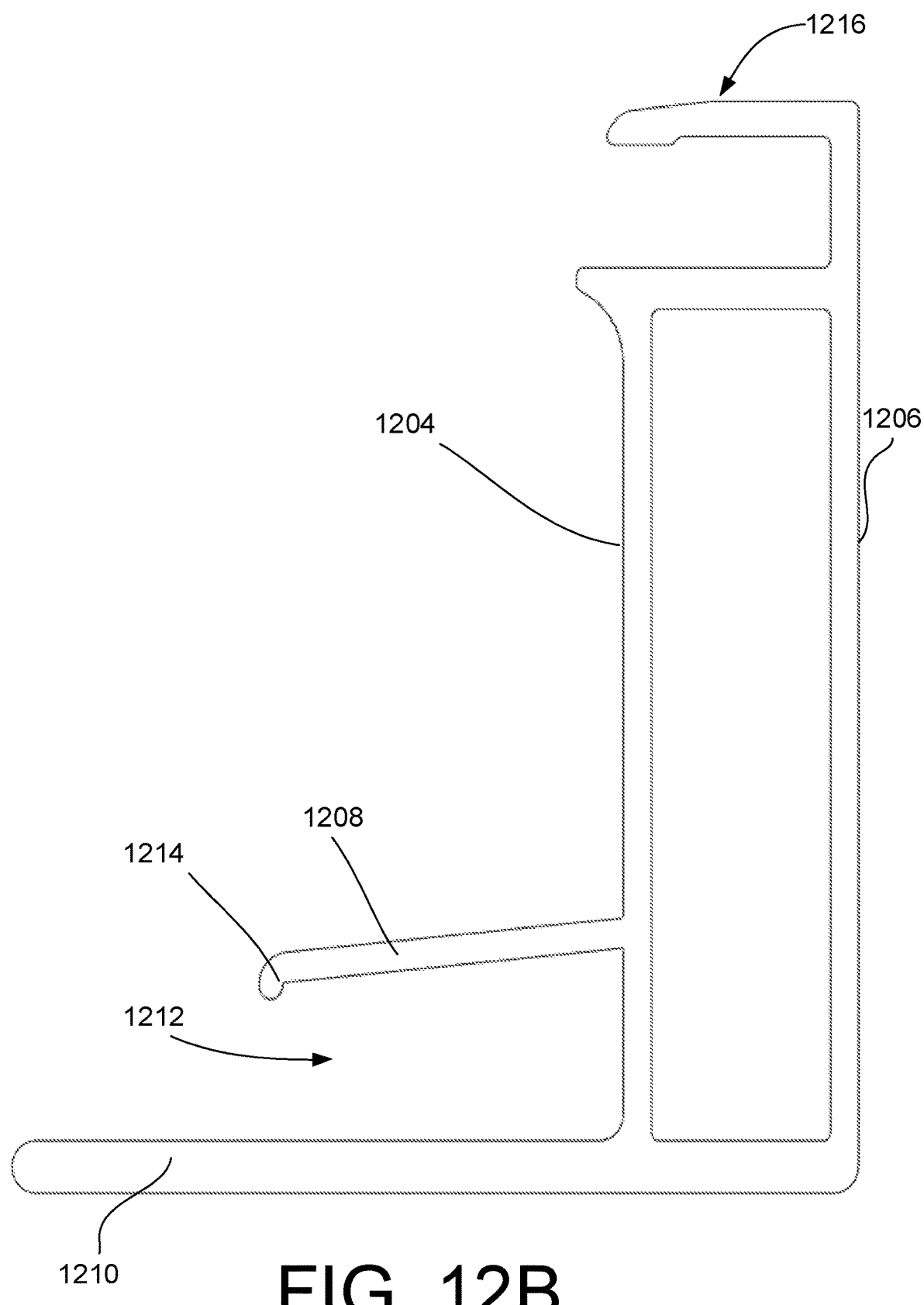

FIG. 12B depicts a frame 1216 similar to the frame 1202 shown in FIG. 12A except the cable management flange 1208 is angled relative to the lower flange 1210. As illustrated in FIG. 12B, the cable management flange 1208 is oblique to the interior surface 1204 and the lower flange 1210 (i.e., the cable management flange 1208 is not parallel or perpendicular to the interior surface 1204 or the lower flange 1210). Specifically, the cable management flange 1208 is angled towards the lower flange 1210 such that the distance between the flanges 1208, 1210 decreases from the interior surface 1204 to the distal ends of the flanges 1208, 1210. The angle of the cable management flange 1208 may enhance the retention capability of the cable cavity. In other embodiments, the lower flange 1210 may be angled.

Figure 12C:
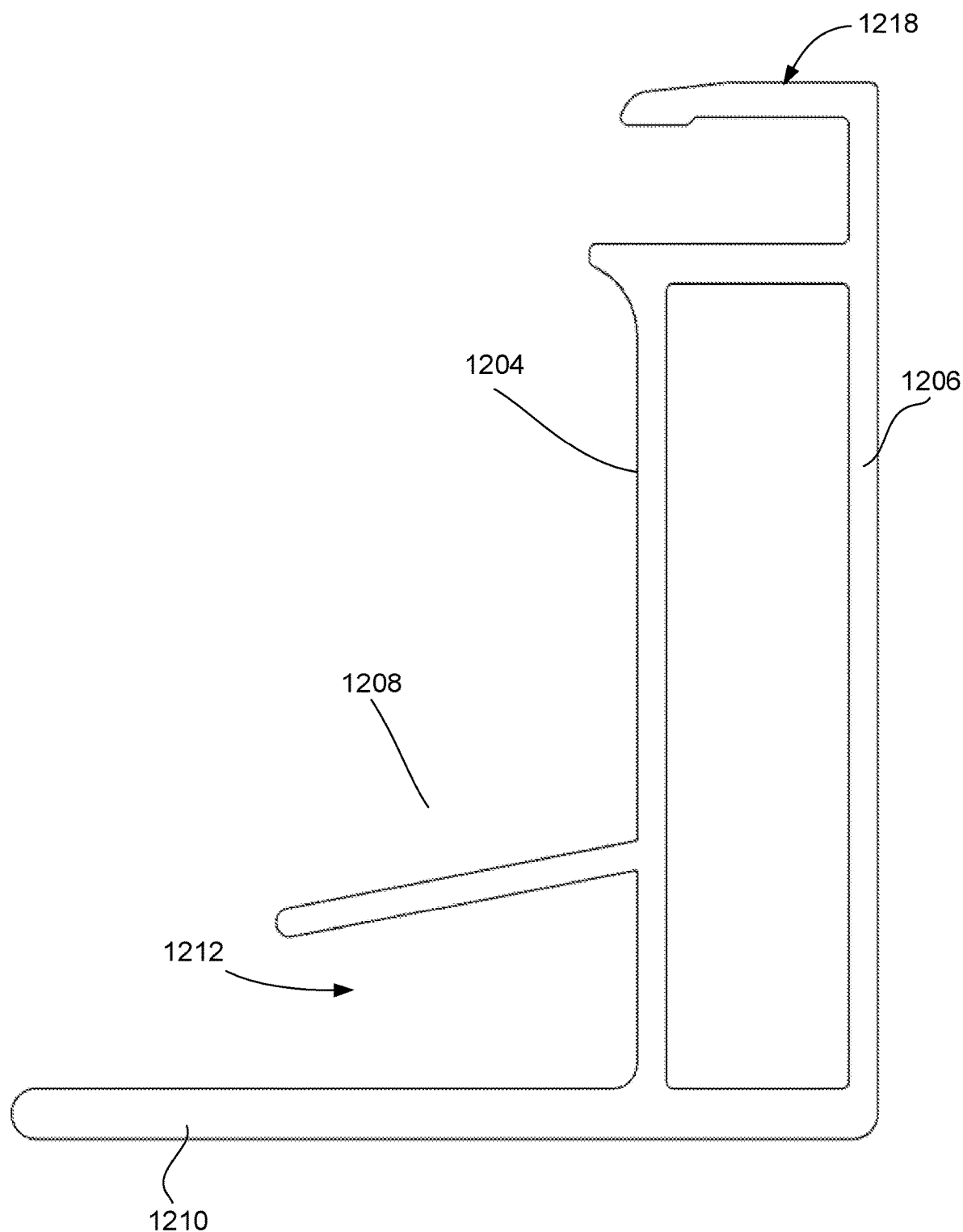

FIG. 12C depicts a frame 1218 similar to the frame 1202 shown in FIG. 12B except the frame 1218 does not include the node 1214. As seen in FIG. 12C, the cable management flange 1208 is angled towards the lower flange 1210. The angle of the cable management flange 1208 facilitates the cable management flange 1208 engaging and retaining the cable in the cable cavity. For example, the distance between the distal ends of the cable management flange 1208 and the lower flange 1210 may be less than or equal to a width of a cable. For example, a distance between the distal ends of the cable management flange 1208 and the lower flange 1210 is in a range of 0.18 inches to 0.75 inches. The cable may be inserted into the cable cavity by displacing at least one of the cable management flange 1208 and the lower flange 1210. After the cable is inserted, the cable management flange 1208 engages and retains the cable in the cable cavity. In addition, the angle of the cable management flange 1208 may allow cables of different sizes to be engaged and retained within the cable cavity because the distance between the flanges 1208, 1210 and, thus, the size of the cable cavity varies along the extension of the angled cable management flange 1208.

A solar module frame of this disclosure advantageously includes ergonomic features and a cable management flange. Notably, by adding the cable management flange to the module frame, the cost of solar module installation (in the materials for cable management implements, and in installation time and effort) may be reduced. Moreover, although the cable management flange substantially eliminates the use of traditional microinverter installation methods, the adapters and adapter assemblies of the present disclosure are provided to overcome such an issue, while still providing all of the benefits (e.g., easier on-site assembly, simple fasteners, etc.) of frame-attached microinverter installation. The various embodiments of the adapters and adapter assemblies not only provide a microinverter installation method with an installation time that is substantially unchanged from that of traditional installation, but also may be used with traditional frames to enable a reduced body frame height, thereby decreasing the cost of the frame.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A cable management system for managing cables associated with an array of solar modules, the cable management system comprising:
a body having a top, a bottom, an interior surface extending vertically between the top and the bottom of the body, an exterior surface extending vertically between the top and the bottom of the body, and an interior cavity between the interior surface and the exterior surface;
a lower flange extending directly from the interior surface of the body, the lower flange including a distal end, wherein the body defines an open recess above the lower flange; and
a cable management flange extending directly from the interior surface of the body above the lower flange, the cable management flange including a distal end, wherein the cable management flange divides the open recess into regions,
wherein the cable management flange and the lower flange define a cable cavity therebetween for retaining at least one cable,
wherein the distal ends of the lower flange and the cable management flange define an opening for inserting the at least one cable into the cable cavity,
wherein the cable management flange is arranged to engage the at least one cable and secure the at least one cable in the cable cavity, wherein the cable management flange is flexible to accept and retain the at least one cable.

2. The cable management system in accordance with claim 1, wherein the cable management flange and the lower flange are parallel.

3. The cable management system in accordance with claim 1, wherein the cable management flange extends at an angle relative to the lower flange.

4. The cable management system in accordance with claim 1, further comprising at least one node disposed on the cable management flange.

5. The cable management system in accordance with claim 1, wherein the cable management flange further comprises a first retention section and a second retention section, wherein the first retention section and the lower flange define a first cable region therebetween, and wherein the second retention section and the lower flange define a second cable region therebetween.

6. The cable management system in accordance with claim 5, wherein the first cable region defines a first distance between the first retention section and the lower flange, and wherein the second cable region defines a second distance between the second retention section and the lower flange.

7. The cable management system in accordance with claim 6, wherein the first distance is greater than the second distance.

8. The cable management system in accordance with claim 1, wherein a distance between the cable management flange and the lower flange is in a range of 0.18 inches to 0.75 inches.

9. The cable management system in accordance with claim 1, wherein the body has a first end and a second end, and wherein the lower flange and the cable management flange extend along a length of the body from the first end to the second end.

10. The cable management system in accordance with claim 1, wherein the at least one cable includes at least one of a DC cable attached to a solar module, an AC cable attached to a solar module, a home run cable, a rack-mounted microinverter cable, a frame-attached microinverter cable, a microinverter trunk cable, or a DCPM cable.

* * * * *